July 29, 1941.   L. V. BLACK ET AL   2,251,106
APPARATUS FOR CASEHARDENING GLASS SHEETS
Filed May 18, 1938   6 Sheets-Sheet 1
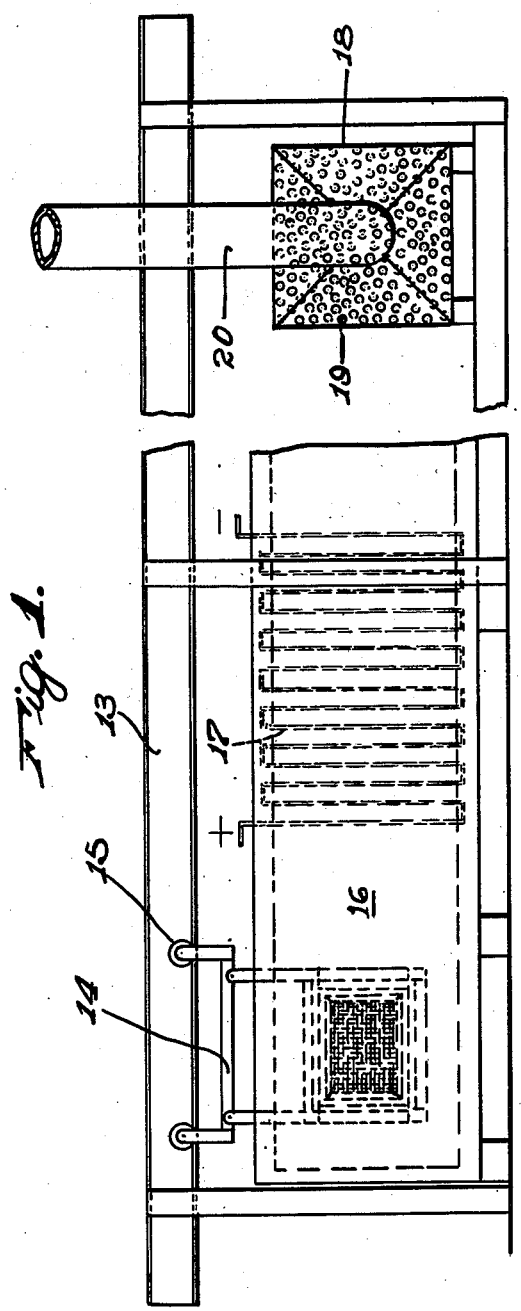
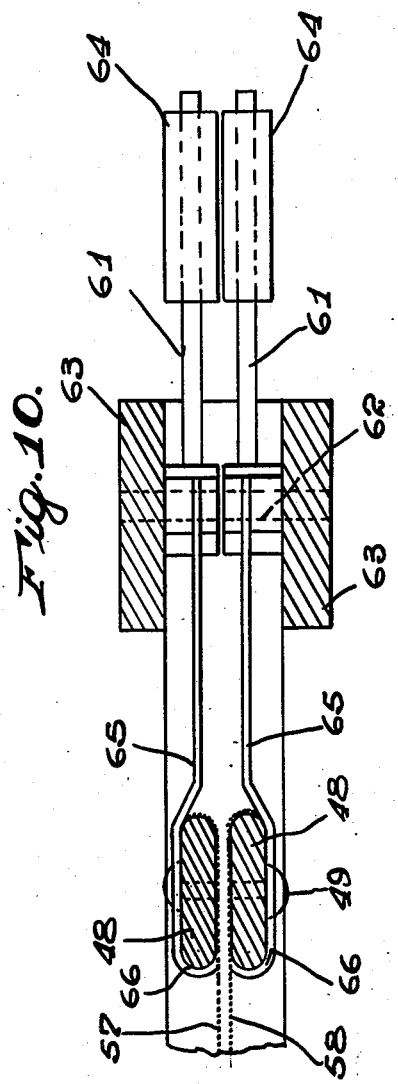
INVENTORS
LLOYD V. BLACK AND
GERALD Z. MINTON
BY Bradley & Bee
ATTORNEYS.

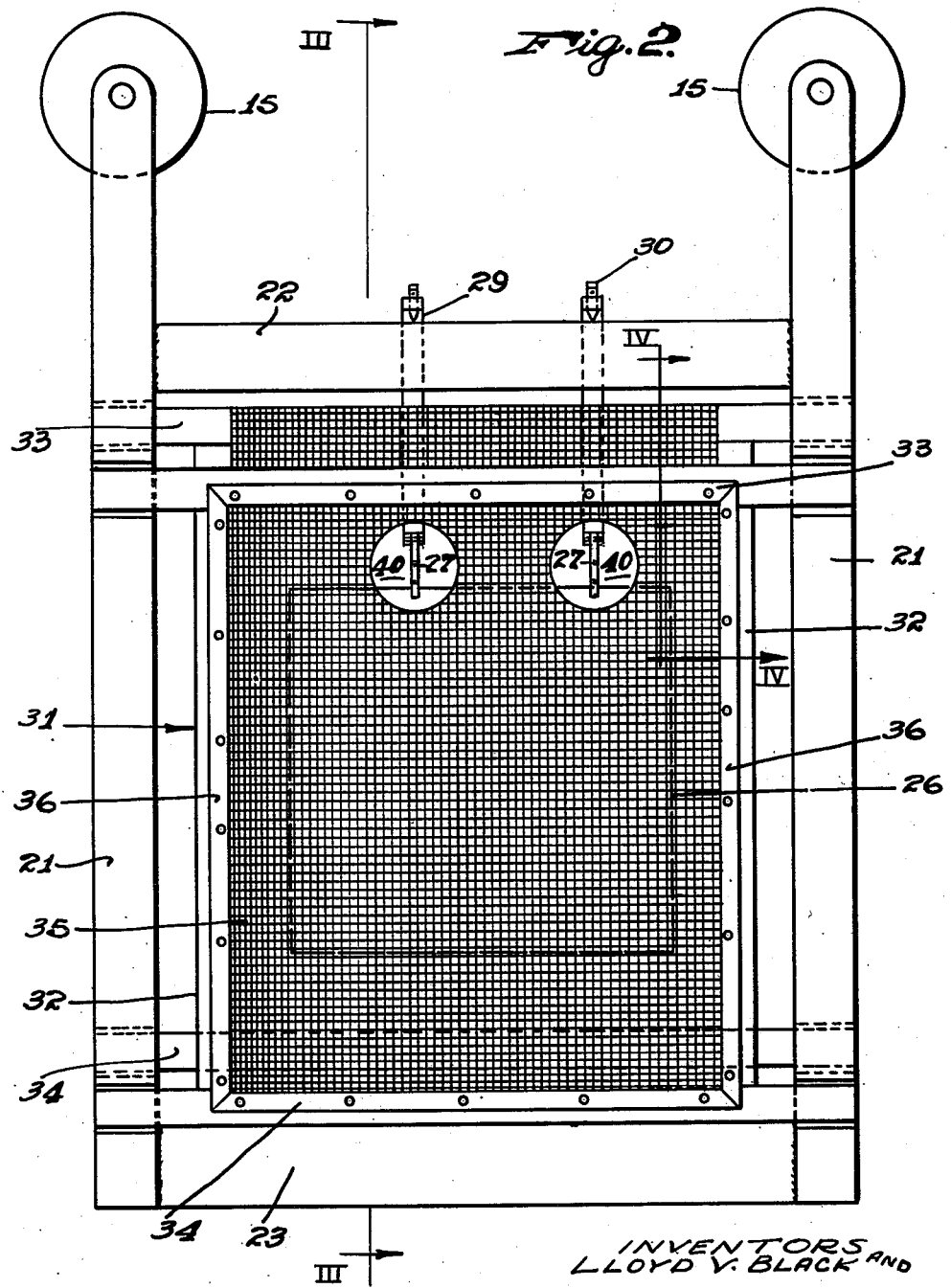

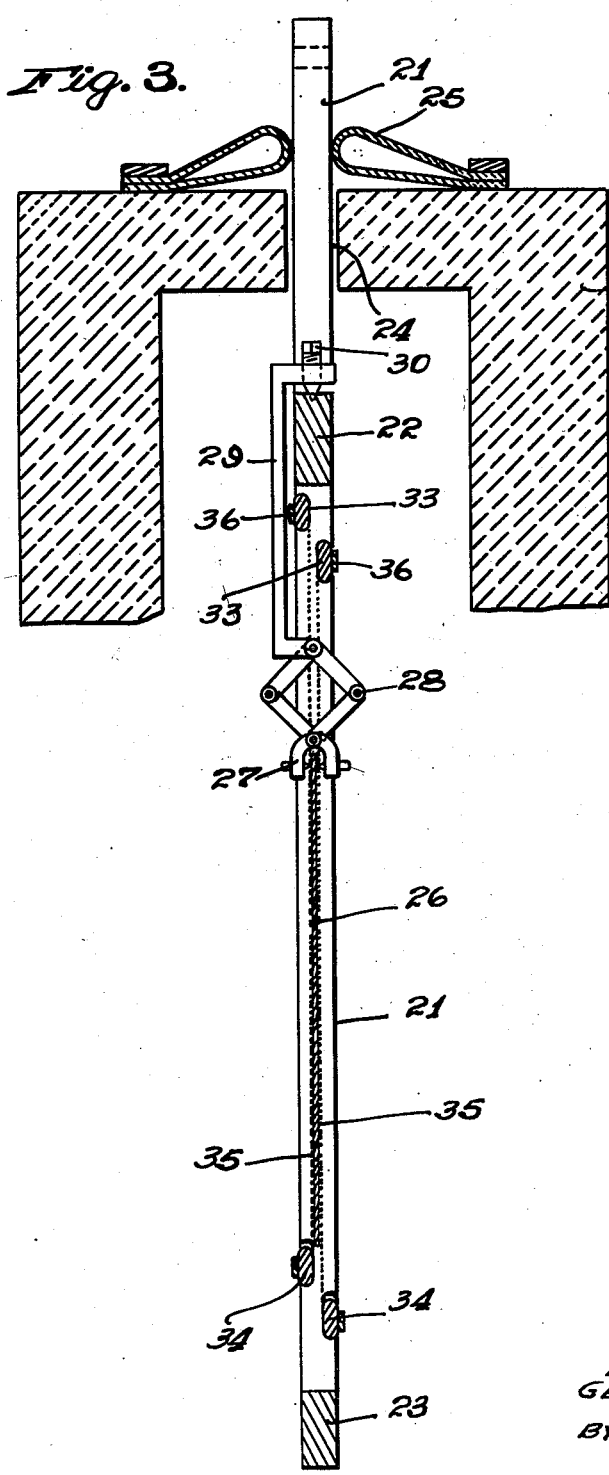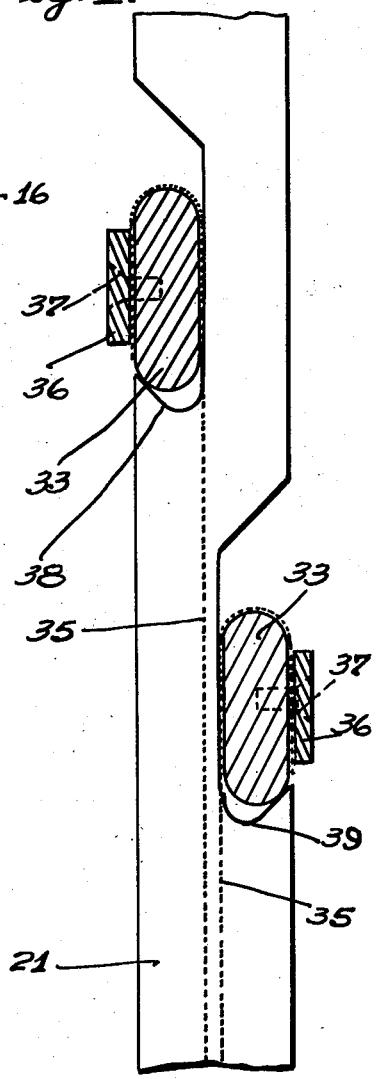

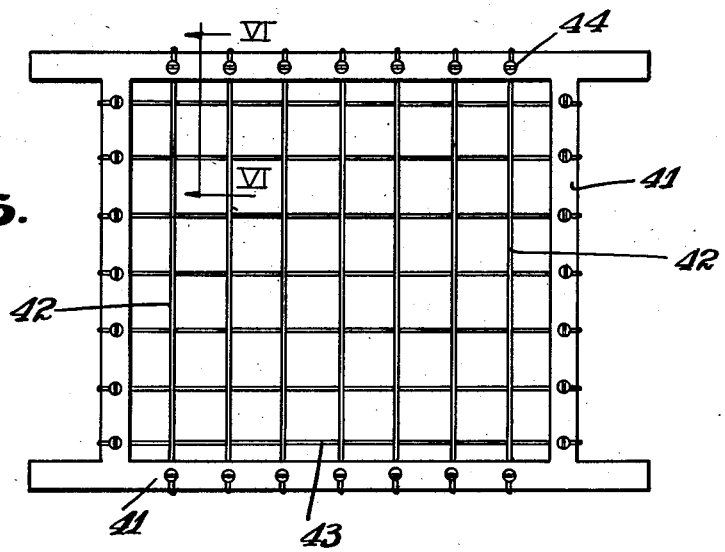
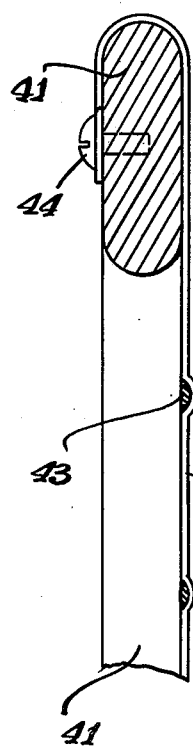
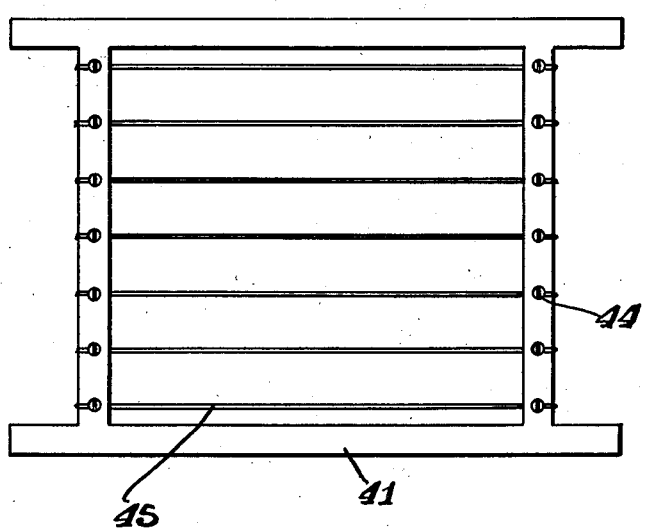

Fig. 8.

July 29, 1941.  L. V. BLACK ET AL  2,251,106
APPARATUS FOR CASEHARDENING GLASS SHEETS
Filed May 18, 1938  6 Sheets-Sheet 6
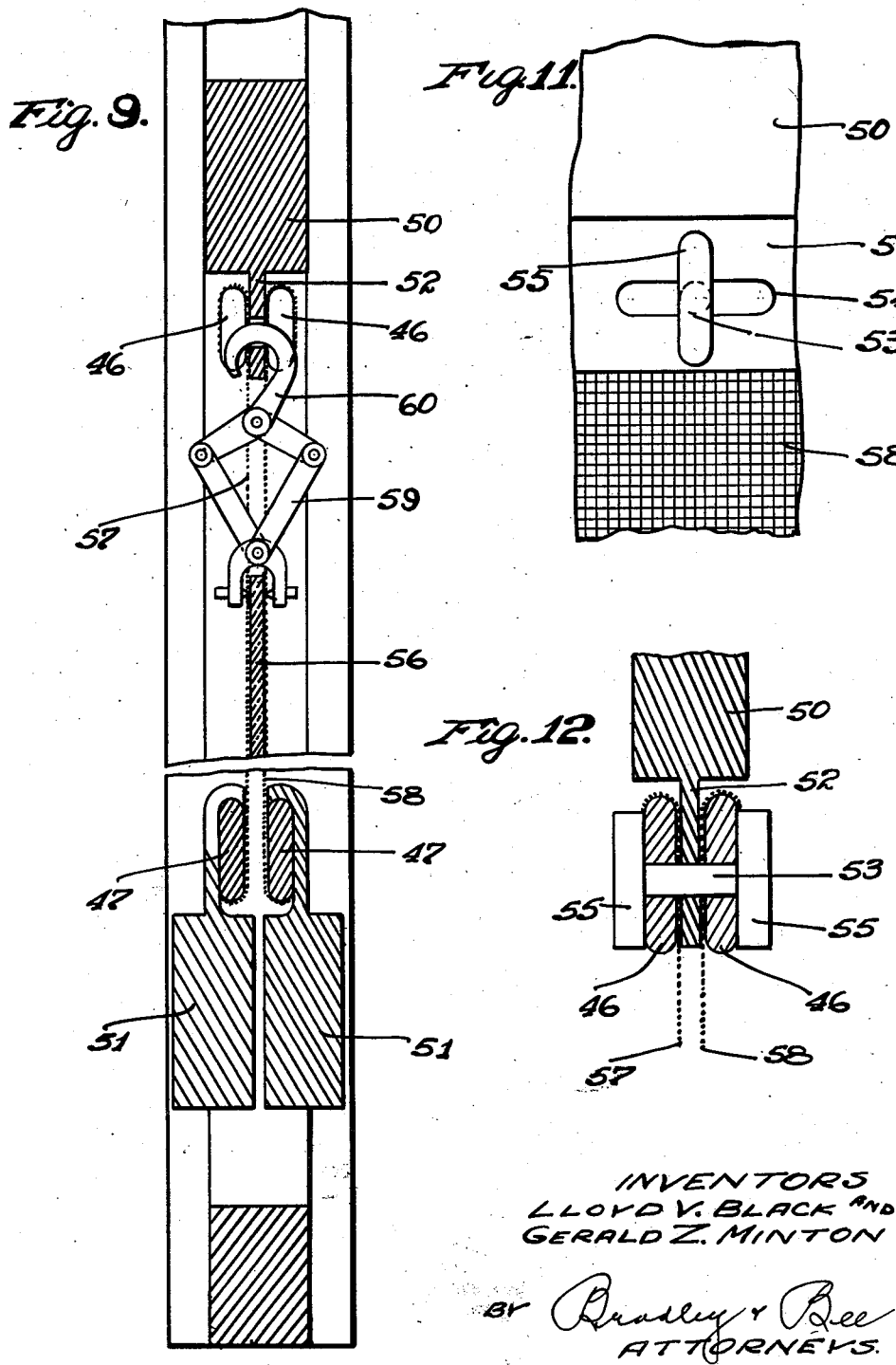
INVENTORS
LLOYD V. BLACK AND
GERALD Z. MINTON
BY Bradley & Bee
ATTORNEYS.

Patented July 29, 1941

2,251,106

UNITED STATES PATENT OFFICE 2,251,106

APPARATUS FOR CASEHARDENING GLASS SHEETS

Lloyd V. Black and Gerald Z. Minton, Tarentum, Pa., assignors to Pittsburgh Plate Glass Company, a corporation of Pennsylvania Application May 18, 1938, Serial No. 208,622

4 Claims. (Cl. 49—45)

The invention relates to a process and apparatus for case hardening glass sheets, and particularly sheets ranging less than one-fourth inch in thickness. Case hardening glass sheets is accomplished in commercial practice by hanging the sheets from their upper edges and heating them to the softening point, after which blasts of air are applied to the opposite sides of the sheets to give a quick cooling of the surface glass. With glass of one-fourth inch or greater in thickness, the glass sheets remain flat and true throughout the operation, but when the process is applied to thin sheets, such as those one-eighth in thickness, difficulty is encountered due to warpage and breakage as the sheets become deformed under the air pressure applied to give the quick cooling. This is particularly the case, since higher air pressures are required in chilling thin sheets then those required for chilling the thicker sheets. The present apparatus and process are designed to overcome this difficulty. Briefly stated, the desired result is accomplished by the provision of means which positively hold the glass flat during the steps of heating and chilling. Such means must be of a character which will not mar the glass while in its highly heated condition and which will not interfere with the rapid cooling of the glass during the application of the cooling blasts of air. Wire screens or grids of light wire engaging the opposite sides of the sheets, and themselves maintained against deformation under varying temperature conditions, fulfill these requirements, as more fully set forth hereafter, certain embodiments of the preferred apparatus employed being shown in the accompanying drawings, wherein:

Figure 1 is a side elevation of the complete apparatus. Fig. 2 is a front elevation of the apparatus for supporting the sheet. Figs. 3 and 4 are sections on the lines III—III and IV—IV respectively of Fig. 2. Figs. 5 and 6 are detail views showing a modification, Fig. 5 being a front elevation and Fig. 6 an enlarged section on the line VI—VI of Fig. 5. Fig. 7 is a front elevation of a modification of the Fig. 5 structure. Fig. 8 is a front elevation of a further modification. Figs. 9 and 10 are sections on the lines IX—IX and X—X respectively of Fig. 8. And Figs. 11 and 12 are detail views, Fig. 11 being a side elevation and Fig. 12 a section on the line XII—XII of Fig. 8.

Referring to the drawings, the general arrangement, as shown in Fig. 1, involves the use of an overhead rail 13 and carrier 14 provided with the wheels 15 riding upon the flanges of the rail 13 and adapted to carry the glass sheet into the furnace 16 in which it is heated to the softening point and is then carried forward out of the furnace to chill it. The chilling apparatus comprises a pair of headers 18 located on opposite sides of the line of travel of the sheet and provided with outlet nozzles 19 directed toward the sheet, air being supplied through the pipes 20.

The carrier or frame for the glass sheet, as shown in Figs. 2, 3 and 4 comprises a pair of side bars 21, 21, and the top bar 22 and a bottom bar 23. The side bars 21, 21 project through a slot 24 in the top of the furnace wall, sealing means for the slot being provided in the form of the recurved sheets of asbestos 25 shown in Fig. 3. The glass sheet 26 which is to be case hardened is supported at its upper edge by means of tongs 27 pivoted together and operated by the links 28, which are supported from bars 29. The bars 29 are in turn hung upon the top bar 22, engagement with the upper face of the bar being secured by means of the screws 30 which engage a groove in the bar, thus permitting adjustment of the bars 29 longitudinally of the bar 22 to any desired location. Supported from the bars 21 on each side of the glass sheet is a rectangular frame 31. Each frame consists of side bars 32, 32 and top and bottom bars 33 and 34, such bars being rigidly secured together at their corners by suitable means. Stretched over each frame is a metal screen 35, the attachment to the bars being preferably made, as indicated in Fig. 4, by passing the edges of the screen around the bars and fastening them by means of the clamping members 36 secured by the screws 37.

The screens are stretched tightly over the frames, so that they lie flat and smooth, since they are the means which serve to hold the glass against deformation during the chilling operation, in which the blasts of air are applied thereto. The frames which support these screens are of a metal having a slightly higher coefficient of expansion than the metal of the screens, so that during the heating and cooling operations, the tendency is to increase the tension on the screens and thus hold them flat and true. This condition may be met by using a frame of heat resisting bronze composition and wire screens of steel composition. Another desirable assembly consists in making the frame and screens both of stainless steel, but varying somewhat in composition, so that the frame has a higher coefficient of expansion than the screen. As indicated in Fig. 4, the top bars 33 of the two frames are supported on inclined shoulders 38 and 39 of the bars 21, so that tendency of the frames is to move toward the plane of the glass due to gravity, which insures that the screens carried by the frames shall press lightly upon the surfaces of the glass sheet. At the bottom of the two frames, the bars 34 fit into recesses in the bars 21, as indicated in Fig. 3. This method of supporting the frames carrying the screens is advantageous, since it permits of the ready removal of either of the screens, which makes it easier to hang the glass sheet 26 upon the tongs. After the glass sheet is hung upon the tongs, the front screen frame which has been removed is positioned, thus completing the assembly. In order to provide room so that the screens do not interfere with the tongs, such screens are preferably cut out, as indicated at 40 in Fig. 2.

After the assembly is made, as indicated in Figs. 2, 3 and 4, the carrier is moved into the heating furnace shown in Fig. 1. The glass is brought up to the softening temperature, after which it is moved at a relatively high speed into position between the headers 18, where the air blasts quickly chill the surface of the glass. The metal screens serve to maintain the glass sheet in a true vertical plane throughout the chilling operation, and we have found that the presence of these screens between air nozzles and the surface of the glass offers no substantial interference with the chilling action of the air. Further, that no marring results from the contact of the screens with the glass surfaces. The temperature to which the glass is heated before the application of air blasts is the same as commonly used in operations of this kind, namely, about 1150 deg. F. Although the glass is softened, so that it will bend at this temperature, it is not sufficiently plastic to take a mark from the wire screens.

Figs. 5 and 6 illustrate a modification, in which the screen mesh is relatively large, perhaps more aptly described, as a grid than a screen, and the frame 41 is, in this case, all in one piece, the screen or grid surface being provided by two sets of intersecting wires 42 and 43, such wires being extended around the bars, as indicated in Fig. 6, and having their ends wrapped around the screws 44. This grid formation is preferably made of relatively small wire which may be flattened slightly at the intersection of the wires so that their inner surfaces lie in substantially the same vertical plane. Fig. 7 illustrates a further modification along the line of Fig. 5, wherein only a single set of wires 45 are employed to give the grid supporting surface. While not as effective as the grid surface of the Fig. 5 construction, the arrangement may be satisfactorily used to accomplish the desired purpose of supporting the glass sheet against deformation during the application of the chilling blasts of air.

Figure 8:
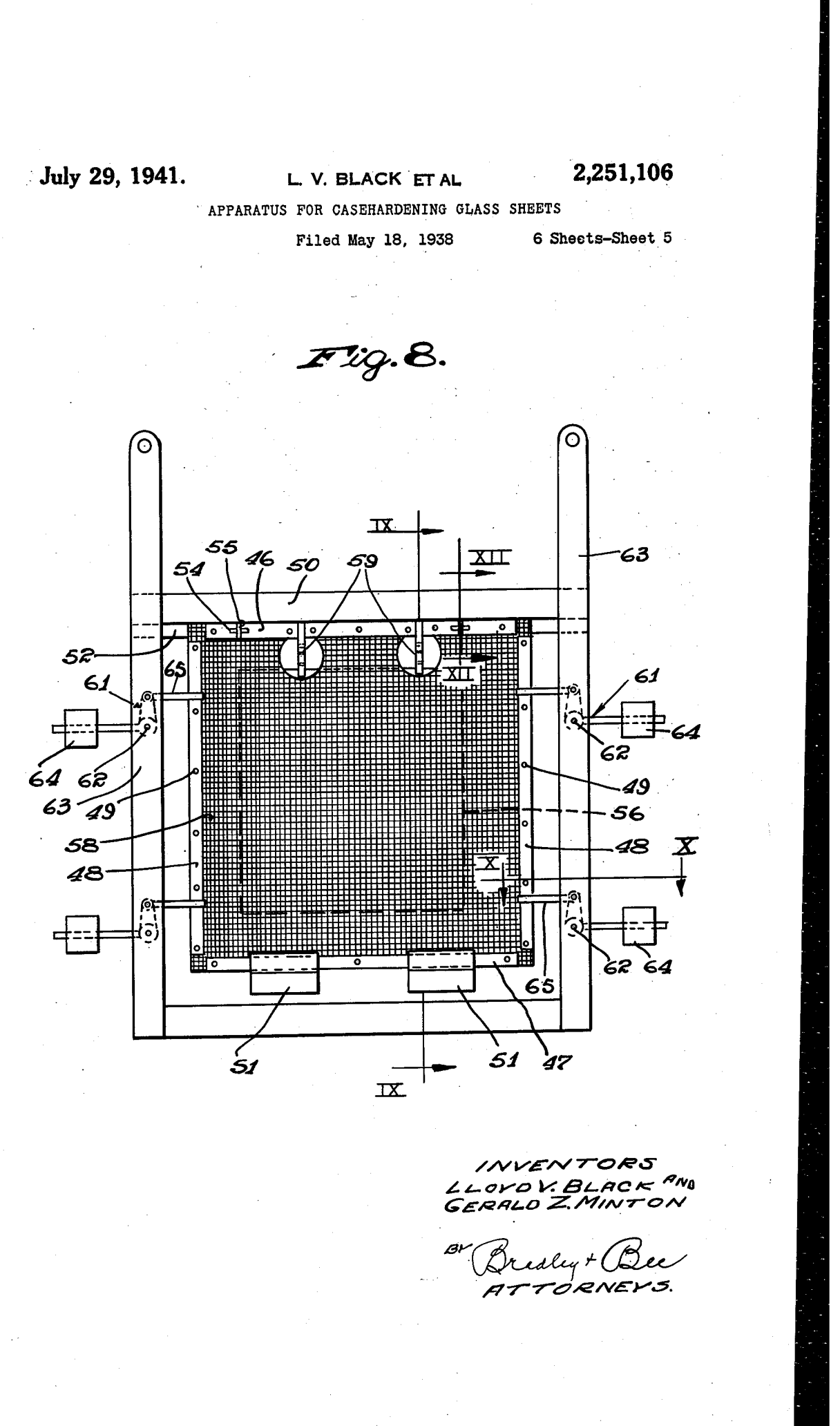

Figs. 8 to 12 illustrate a construction quite similar to that of Figs. 1 to 4, but employing a different expedient for keeping the metal screens stretched during the varying temperature conditions, so that they lie in true vertical planes. In this construction, the top and bottom bars 46 and 47 for each screen are separate from the side bars 48, 48, and provision is made for applying yielding tension to the bottom bar and to the side bars, so as to hold the screen flat by reason of this tension. The screens are extended around the bars at their edges and fastened by means of rivets 49 arranged at suitable intervals. The bar 46 is hung from the bar 50 constituting a part of the carrier frame and vertical tension is applied to the bottom bar 47 by means of the pairs of weights 51, 51 which are hooked over the bars 47, as indicated in Fig. 9. The two top bars 46 lie on opposite sides of a tongue 52 projecting downward from the bar 50, as indicated in Figs. 9 and 12, and attachment of the bars 46 to this tongue is accomplished by means of the bolts 53 which extend through both the bars 46 and the tongue. The openings through which these bolts extend are in the form of slots 54, as shown in Fig. 11, while the ends of the bolts are in the form of the wings 55. This provides a connection which may be readily released when it is desired to detach the screen frames from the bar 50. All that is necessary is to turn the wings 55, 90 degrees so that they are in line with the slots 54, after which the bolts may be pulled out of the slots.

The glass sheet 56 which lies between the screens 57 and 58 is supported by means of the tongs 59 whose closing links are attached to the hooks 60. These hooks extend through suitable slots in the tongue 52 which project downwardly from the bar 50. Provision is made for tensioning the screen in a horizontal direction by means of the weighted bell crank levers 61 (Fig. 8) which are pivoted at 62 in the side bars 63 of the carrier frame. These bell crank levers are provided with weights 64 and have their vertical arms attached to the side bars 48 by means of the tensioning connections 65 which hook around the bars, as indicated at 66 in Fig. 10. It will be seen that by this arrangement involving the use of the weights 51 and the bell crank levers 61, the screens are tensioned both vertically and horizontally, so that regardless of contraction and expansion in such screens due to temperature conditions, they are maintained in flat condition throughout the heating and chilling treatment, thus insuring that no warpage shall occur in the glass sheets. In this construction, as in that of Figs. 1 to 5, the parts exposed to the heat of the furnace are preferably of heat resisting metal, such as stainless steel.

It will be apparent that a wide variety of "screens" or "grids" may be used to perform the function of holding the glass sheet flat, while still permitting the passage of air therethrough so as to chill the surfaces of the sheet, and it will be understood that the invention is not limited to the particular forms of screening illustrated. Certain forms of screen of the link or chain type tend to remain flat under changing temperature conditions, and will maintain themselves flat, due to gravity, without the use of weights or will require weights only at the bottom edge. Very thin foraminous plates will also act as a substitute for the woven screen illustrated, the invention not being limited to the conventional types commonly associated with the term "screen."

What we claim is:

1. An apparatus for case hardening flat sheet comprising gripping means for engaging the upper edge of the sheet and suspending it in a substantially vertical plane, a pair of metallic screens disposed substantially vertically and engageable against opposite sides of the glass sheet to hold the latter against distortion during the application of heat and chilling air thereon, and means vertically and horizontally tensioning each screen to hold it in a vertical plane against the glass sheet surface.

2. An apparatus for case hardening a flat sheet comprising gripping means for engaging the upper edge of the sheet and suspending it in a substantially vertical plane, a pair of metallic screens disposed substantially vertically and engageable against opposite sides of the glass sheet to hold the latter against distortion during the application of heat and chilling air thereon, and weights vertically and horizontally tensioning each screen to hold it in a vertical plane against the glass sheet surface.

3. An apparatus for case hardening a flat glass sheet comprising gripping means for engaging the upper edge of the sheet and supporting it in a substantially vertical plane, a pair of metallic screens disposed substantially vertically and engageable against opposite sides of the glass sheet to hold the latter against distortion during the application of heat and chilling air thereon and a metal frame carrying each screen and having a higher coefficient of expansion than the metal of the screen.

4. An apparatus for case hardening a flat glass sheet comprising gripping means for engaging the upper edge of the sheet and suspending it in a vertical plane, a vertical metal frame unit disposed upon each side of the vertical plane of the suspended sheet, each unit including metal skeleton members provided with a metal grid having a lower coefficient of expansion than the metal skeleton members to tension the grids in response to the application of heat to the unit, and means associated with the units yieldably pressing and supporting the grids against opposite sides of the glass sheet to hold the latter against distortion during application of heat and chilling air thereto.

LLOYD V. BLACK.
GERALD Z. MINTON.